J. S. LUDWIG.
CULTIVATOR.
APPLICATION FILED FEB. 7, 1910.
961,304.
Patented June 14, 1910.
2 SHEETS—SHEET 1.
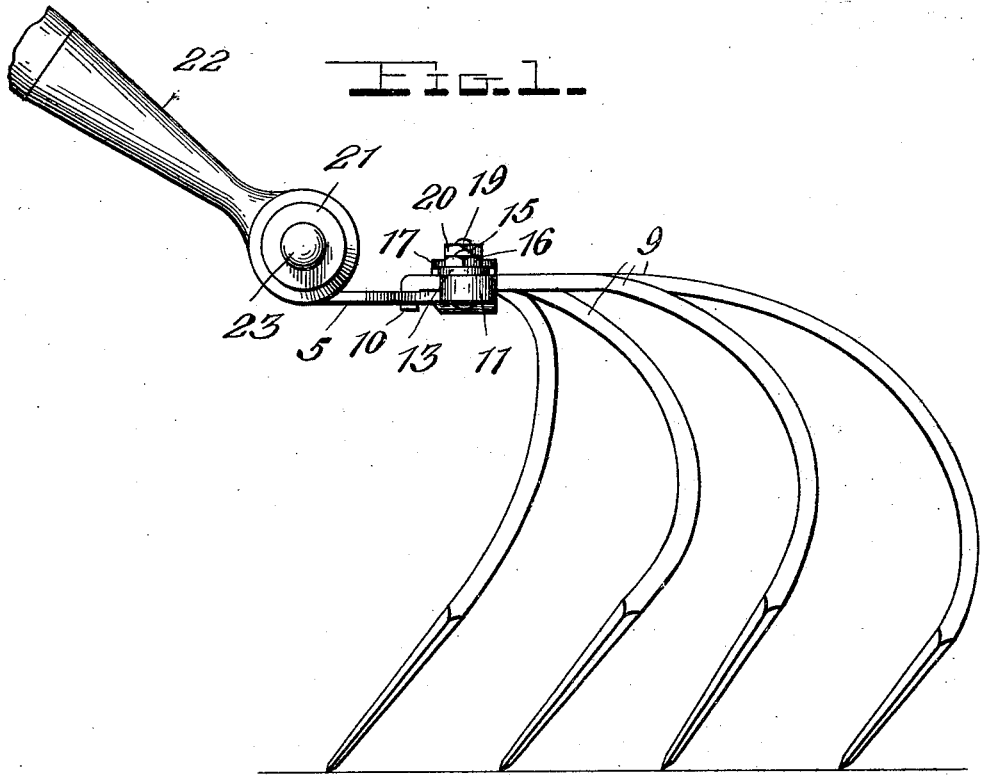
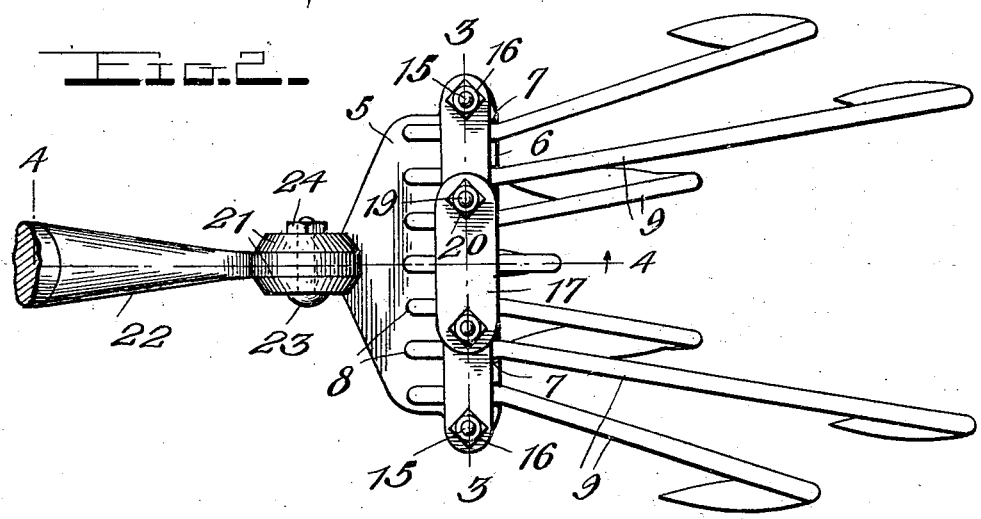
Witnesses
Chas. L. Griesbauer.
E. M. Pickette.
Inventor
J. S. Ludwig,
By Watson E. Coleman
Attorney

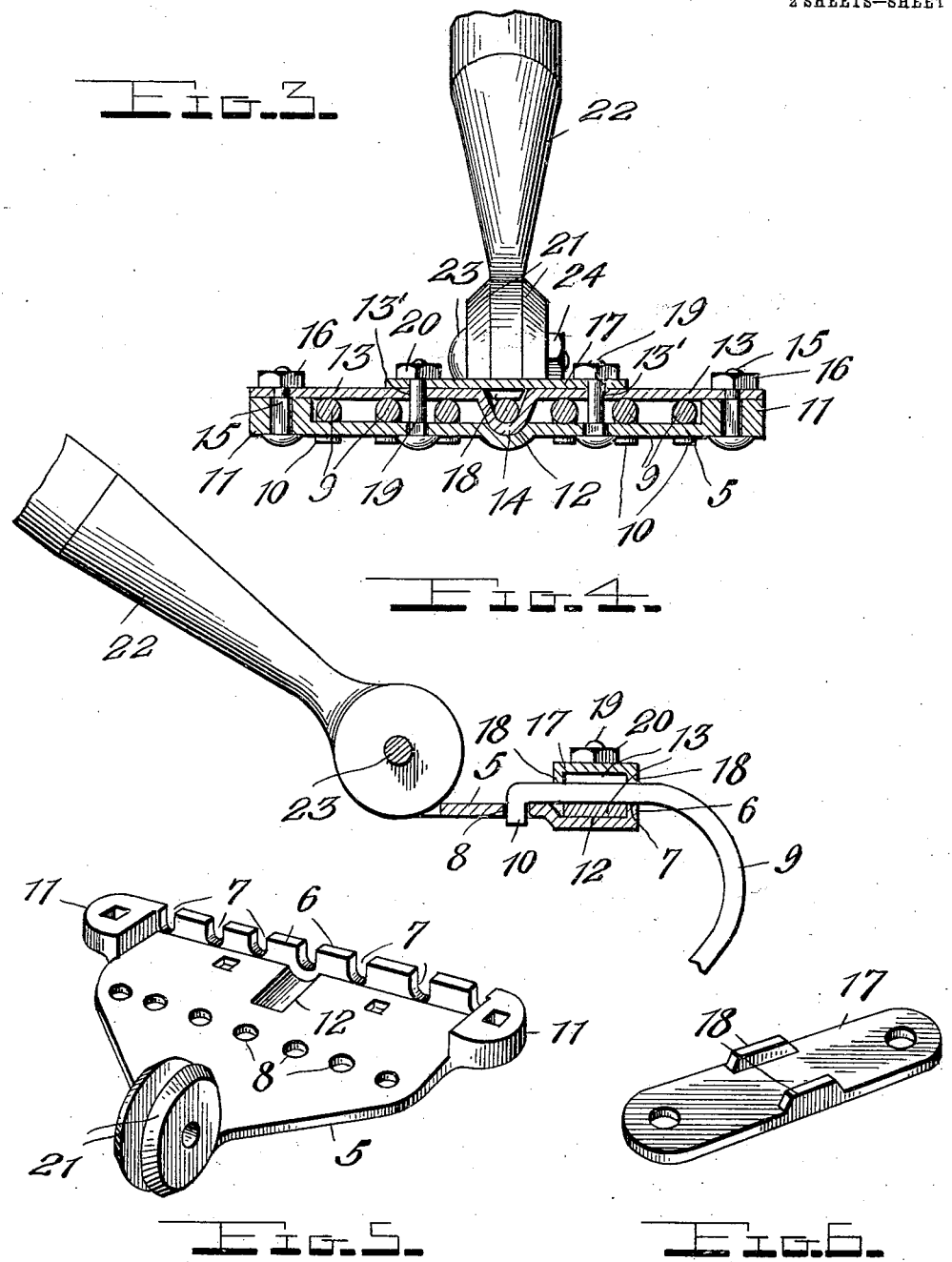

UNITED STATES PATENT OFFICE.

JOHN SHELTOM LUDWIG, OF BUSHNELL, ILLINOIS.

CULTIVATOR.

961,304.  Specification of Letters Patent.  Patented June 14, 1910.

Application filed February 7, 1910. Serial No. 542,531.

*To all whom it may concern:*

Be it known that I, JOHN S. LUDWIG, a citizen of the United States, residing at Bushnell, in the county of McDonough and State of Illinois, have invented certain new and useful Improvements in Cultivators, of which the following is a specification, reference being had to the accompanying drawings.

This invention relates to cultivators and more particularly to an improved hand cultivator adapted for use in gardens or on small truck farms.

The primary object of the invention is to provide suitable means for securing the cultivator tines to the head plate whereby one of said tines may be easily and quickly removed when desired.

Another object resides in the provision of a head plate adapted to have secured thereon an odd number of tines, the central one of said tines having its point positioned in advance of the others, a plate secured at its ends upon the head plate and extending into a recess therein, said plate receiving the central one of the tines, and a second plate securing the tine in position whereby it may be removed without releasing the remainder of the tines.

A further object is to provide a device of the above character of simple and inexpensive construction and one which is highly efficient and durable in use.

With these and other objects in view, the invention consists of the novel features of construction and the combination and arrangement of parts hereinafter fully described and claimed, and illustrated in the accompanying drawings, in which—

Figure 1 is a side elevation of a hand cultivator embodying my improvements; Fig. 2 is a top plan view thereof; Fig. 3 is a section taken on the line 3—3 of Fig. 2; Fig. 4 is a section taken on the line 4—4 of Fig. 2, Fig. 5 is a detail perspective view of the head plate; and Fig. 6 is a similar view of the plate for clamping the central tine.

Referring more particularly to the drawings 5 indicated a head plate which has formed upon its rear edge the flange 6 provided with a plurality of notches 7. Adjacent to its forward edge the plate 5 is provided with a series of openings 8. The tines 9 have their shanks positioned in the notches 7 and are formed with downwardly turned extremities as shown at 10, said extremities being disposed through a series of openings 8 in the head plate whereby the tines are prevented from turning thereon.

The plate 5 is formed at its opposite sides with the outwardly extending ears 11 and a notch or recess 12 is centrally formed in said plate in alinement with the ears. After arranging the tines upon the plate in the manner above set forth, a clamping plate 13 is positioned over the same with its ends seated upon the ears 11. This plate is formed with a central and downwardly extending U shaped portion 14 which is adapted to be disposed in the central recess 12 of the head plate. Suitable bolts 15 are disposed through the ears 11 and the ends of the clamping plate, nuts 16 being engaged upon the upper ends of said bolts whereby the plate may be securely clamped in engagement with the tines. As shown in the drawings three of the tines 9 would preferably be arranged upon opposite sides of the center of the plate 5. The seventh or central tine is adapted to be disposed in the U shaped portion 14 of the clamping plate. The shank of this tine is also disposed through the central notch 7 and has its extremity extending through one of the notches similar to the remaining tines.

It will be noted from reference to Fig. 2 that the points of the tines upon opposite sides of the center of the head plate are disposed one in advance of the other, while the central tine has its earth engaging point disposed considerably in advance of the other tines. It has been found by experiment that this is the best arrangement of the tines for the use to which the cultivator is more particularly adapted. At times, however, it may be desired to remove the central tine and in order to effect this purpose without disturbing the relative positions of the remaining tines, I provide a second clamping plate 17 adapted to be centrally arranged upon the plate 13 and provided on each of its longitudinal edges with a laterally extending lug 18. These lugs are adapted to engage upon the shank of the central tine 9, and securely retain the same in position between the opposed walls of the U shaped portion 14 of the plate 13. Bolts 19 extend through the head plate 5, openings 13' provided in the clamping plate 13, and through the extremities of the plate 17. Nuts 20 are engaged upon the upper ends of these bolts and clamp the plate 17 in position upon the central tine 9. The forward edge of the head plate 5 is integrally formed at its center with the spaced ears 21. Between these ears the end of a handle 22 is adapted to be positioned and adjustably secured by means of a pivot bolt 23 having a nut 24 threaded upon one of its ends. Thus the handle may be readily adjusted between the ears to position the same at any angle which may be found most suitable under the circumstances in which the cultivator is being used.

From the foregoing it is believed that the operation and many advantages to be obtained by the use of my improved cultivator will be readily apparent without necessitating a more extended description. The means employed for securing the tines in position is simple, may be economically manufactured, and is highly efficient for the purpose in view. By removing the plate 17, the central tine may be readily removed without in any manner disturbing the arrangement of the remaining tines. While I have shown and described a particular arrangement of the tines, it will be obvious that they may be otherwise arranged than as shown in the drawing without departing from the spirit or sacrificing any of the advantages of the invention. The particular form of the remaining elements is also susceptible of considerable modifications within the scope of the claims.

Having thus described my invention, what is claimed is:—

1. A hand cultivator comprising a head plate having its forward edge flanged and provided with a plurality of notches, an odd number of cultivator tines arranged upon said head plate and seated in the notches, a clamping plate secured at its ends to the head plate engaging with the tines on opposite sides of the central one to rigidly secure them in position, and means engaging with the central tine at each edge of the clamping plate, to secure the same whereby it may be removed independently of the remaining tines.

2. A hand cultivator comprising a head plate, an odd number of cultivator tines arranged thereon in spaced relation, ears extending outwardly from the opposite sides of said plate, a clamping plate having its ends disposed upon said ears and secured thereto, said plate engaging with the tines upon opposite sides of the central one to secure them in their relative positions, and a clamping plate engaging with said central tine to secure the same in operative position whereby said tine may be removed without disturbing the arrangement of the others.

3. A hand cultivator comprising a head plate, an odd number of tines arranged thereon, ears extending outwardly from the opposite sides of the head plate, said plate having a recess in alinement with the ears, a clamping plate secured at its end to said ears and engaging with the tines upon opposite sides of the central one to secure the same in their relative positions, said plate depending at its center into a recess in the head plate, and a clamping plate secured upon said first named plate having lugs formed upon its opposite edges engaging with the central tine to secure the same whereby it may be removed without disturbing the arrangement of the others.

4. A hand cultivator comprising a head plate having an odd number of cultivator tines arranged thereon, said plate having an ear extending from each side thereof and provided with a central recess in alinement with the ears, a clamping plate secured upon said ears and formed with a central U shaped portion adapted to be disposed in said recess, said plate securing the tines upon opposite sides of the central one in their relative operative positions, a second clamping plate arranged upon the first named plate, securing bolts extending through the head plate and each of said clamping plates having nuts engaged upon their upper ends to secure the last named clamping plate in position, said plate having depending lugs formed upon its longitudinal edges engaging with the central tine to secure the same between the opposed walls of the U shaped portion of the first named clamping plate whereby said tine is secured in operative position and is adapted to be removed from the head plate without disturbing the arrangement of the remaining tines, spaced ears formed upon the forward edge of the head plate, and an operating handle adjustably disposed between said ears.

In testimony whereof I hereunto affix my signature in the presence of two witnesses.

JOHN SHELTOM LUDWIG.

Witnesses:
  W. W. SEIBERT,
  JOHN LEIB.